(12) United States Patent
Totsuka

(10) Patent No.: US 11,140,351 B2
(45) Date of Patent: Oct. 5, 2021

(54) PHOTOELECTRIC CONVERSION APPARATUS, PHOTOELECTRIC CONVERSION SYSTEM, AND MOBILE OBJECT

(71) Applicant: CANON KABUSHIKI KAISHA, Tokyo (JP)

(72) Inventor: Hirofumi Totsuka, Fujisawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/902,452

(22) Filed: Jun. 16, 2020

(65) Prior Publication Data
US 2020/0404209 A1 Dec. 24, 2020

(30) Foreign Application Priority Data
Jun. 20, 2019 (JP) .............................. JP2019-114968

(51) Int. Cl.
*H04N 5/355* (2011.01)
*H04N 5/3745* (2011.01)
*H04N 5/378* (2011.01)

(52) U.S. Cl.
CPC ......... *H04N 5/378* (2013.01); *H04N 5/35554* (2013.01); *H04N 5/37455* (2013.01); *H04N 5/37457* (2013.01)

(58) Field of Classification Search
None
See application file for complete search history.

(56) References Cited

U.S. PATENT DOCUMENTS

| | | | |
|---|---|---|---|
| 2008/0192127 A1 | 8/2008 | Sakai | |
| 2014/0313385 A1 | 10/2014 | Sato | |
| 2018/0109736 A1 | 4/2018 | Ishii | |
| 2018/0262706 A1* | 9/2018 | Totsuka | ................. H04N 5/378 |

FOREIGN PATENT DOCUMENTS

| | | |
|---|---|---|
| JP | 2013-229852 A | 11/2013 |
| JP | 2018-056723 A | 4/2018 |

* cited by examiner

*Primary Examiner* — Mark T Monk
(74) *Attorney, Agent, or Firm* — Canon U.S.A., Inc. IP Division

(57) ABSTRACT

A photoelectric conversion apparatus includes a plurality of pixels, a generation unit configured to generate a first reference signal changing in potential in a first period from a first point in time to a second point in time, and a second reference signal having a gradient larger than a gradient of the first reference signal and changing in potential in a second period from a third point in time to a fourth point in time, and a plurality of analog to digital (AD) conversion units. Each of the AD conversion units includes a selection circuit configured to select the first reference signal or the second reference signal, and a comparator. The first period and the second period partially overlap with each other. The third point in time is later than the first point in time.

21 Claims, 6 Drawing Sheets

PHOTOELECTRIC CONVERSION APPARATUS, PHOTOELECTRIC CONVERSION SYSTEM, AND MOBILE OBJECT

BACKGROUND OF THE INVENTION

Field of the Invention

The aspect of the embodiments relates to a photoelectric conversion apparatus, a photoelectric conversion system, and a mobile object.

Description of the Related Art

Japanese Patent Application Laid-Open No. 2013-229852 discusses a photoelectric conversion apparatus that includes a plurality of pixels arranged in a plurality of columns, and a plurality of analog to digital (AD) conversion units arranged in the respective columns, and that compares a reference signal with a pixel signal in each of the AD conversion units. In Japanese Patent Application Laid-Open No. 2013-229852, the AD conversion unit compares one of two reference signals having different gradients with a pixel signal to perform AD conversion.

If a level of the pixel signal is lower than a predetermined comparative level at the time of comparison between a reference signal and the pixel signal, the AD conversion unit selects a reference signal having a gentle gradient (high conversion gain) to perform the comparison. If the level of the pixel signal is higher than the comparative level at the time of comparison between a reference signal and the pixel signal, the AD conversion unit selects a reference signal having a steep gradient (low conversion gain) to perform the comparison.

While the pixel signal can be converted to a digital signal with high accuracy according to Japanese Patent Application Laid-Open No. 2013-229852, there is room for further improvement in image quality. For example, a case is cited where part of the AD conversion units (first AD conversion unit) and another part of the AD conversion units (second AD conversion unit) output different results of comparison between a level of the pixel signal and the comparative level. More specifically, a case is cited where the level of the pixel signal input to the first AD conversion unit is lower (dark level) than the comparative level, and the level of the pixel signal input to the second AD conversion unit is higher (bright level) than the comparative level. In this case, inversion timing of an output from a comparator of the first AD conversion unit and inversion timing of an output from a comparator of the second AD conversion unit may occur at close time or the same time. In this case, an inversion operation of the comparator of one AD conversion unit may affect a comparison result of the comparator of another AD conversion unit as kickback noise. In particular, the kickback noise due to the inversion operation of the comparator of the second AD conversion unit can enter the comparator of the first AD conversion unit and can cause the inversion operation of the comparator of the first AD conversion unit at a timing different from that of an original dark level. This may cause a difference in dark level between a case where all of the pixels belonging to one row are at the dark level and the case described above, thereby leading to streaks (horizontal smear).

SUMMARY OF THE INVENTION

According to an aspect of the embodiments, a photoelectric conversion apparatus includes a plurality of pixels including a first pixel and a second pixel, a generation unit configured to generate a first reference signal changing in potential in a first period from a first point in time to a second point in time, and a second reference signal having a gradient larger than a gradient of the first reference signal and changing in potential in a second period from a third point in time to a fourth point in time, and a plurality of analog to digital (AD) conversion units including a first AD conversion unit to which a signal from the first pixel is input, and a second AD conversion unit to which a signal from the second pixel is input. Each of the plurality of AD conversion units includes a selection circuit configured to select the first reference signal or the second reference signal, and a comparator configured to compare the first reference signal or the second reference signal selected by the selection circuit with a signal from one of the pixels. The first period and the second period partially overlap with each other. The third point in time is later than the first point in time.

Further features of the disclosure will become apparent from the following description of exemplary embodiments with reference to the attached drawings.

DESCRIPTION OF THE EMBODIMENTS

Figure 1A:
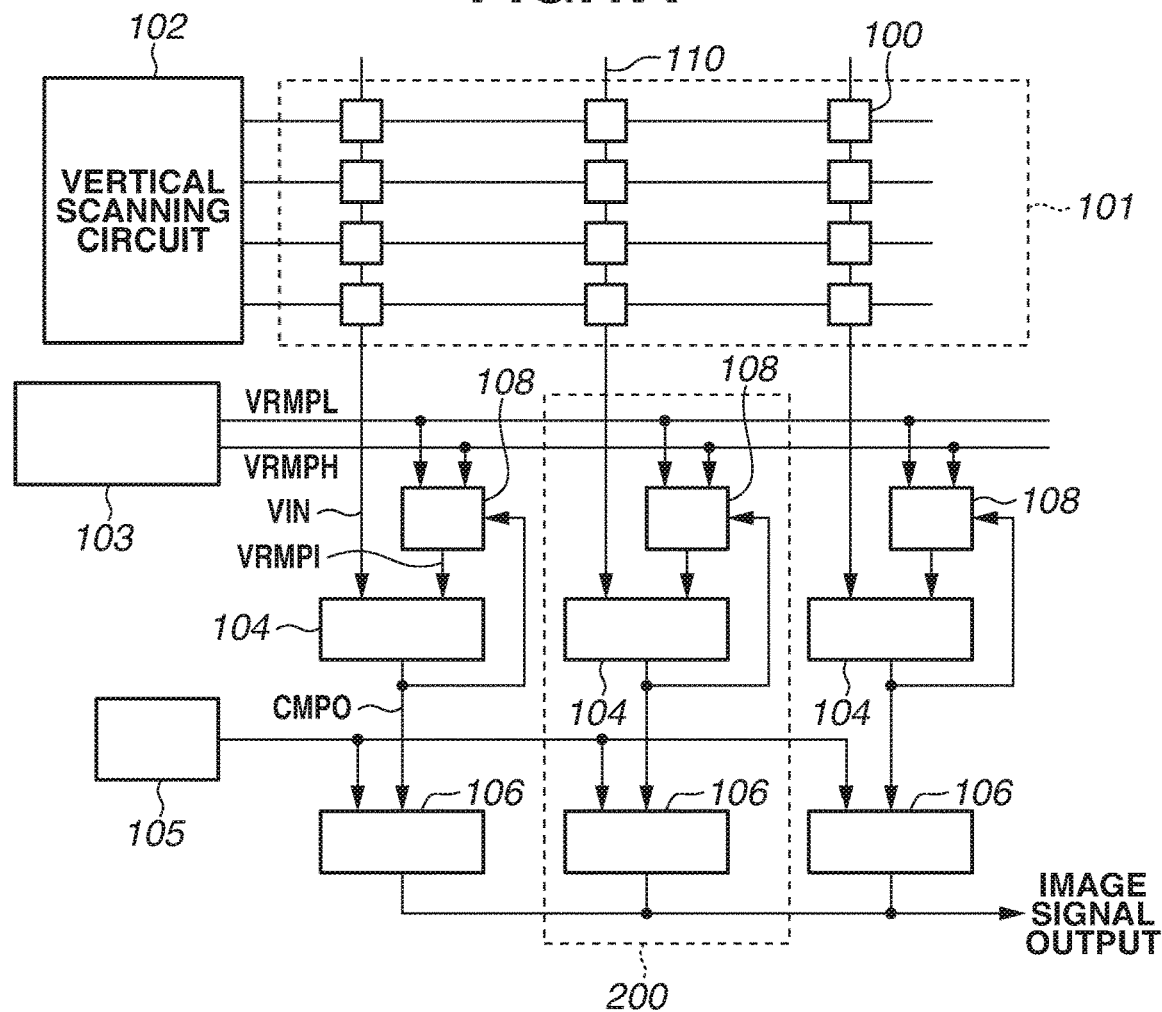
FIGS. 1A and 1B are diagrams each schematically illustrating a configuration of a photoelectric conversion apparatus according to a first exemplary embodiment.

Exemplary embodiments described below are merely examples to embody technical ideas of the disclosure and are not intended to limit the disclosure. The sizes of members and positional relationships among the members in the drawings may be exaggerated for the purpose of clear illustration. In the description below, the same -s will be designated by the same reference numerals, and a description thereof will be omitted.

A first exemplary embodiment will be described below. FIG. 1A is a diagram schematically illustrating a configuration of a photoelectric conversion apparatus according to the present exemplary embodiment. A pixel array 101 includes a plurality of pixels 100 arranged in a plurality of rows and a plurality of columns. A vertical scanning circuit 102 sequentially scans the plurality of pixels 100 in the pixel array 101 on a row-by-row basis. The plurality of pixels 100 in each row is electrically connected to the vertical scanning circuit 102 via a control signal line.

The plurality of pixels 100 in each column is electrically connected to a vertical signal line 110. The vertical signal line 110 of each column is arranged to correspond to one column of the plurality of pixels 100. The vertical signal line 110 is electrically connected to a comparator 104 arranged outside the pixel array 101. A signal output from each of the plurality of pixels 100 is input to the comparator 104 via the vertical signal line 110. The signal input to the comparator 104 is referred to as a signal VIN. An output from the comparator 104 is referred to as an output CMPO. The comparator 104 and a selection circuit 108 are electrically connected to each other. More specifically, the comparator 104 and the selection circuit 108 are electrically connected so that an output from the selection circuit 108 is input to the comparator 104.

A reference signal generation unit 103 (a generation unit) supplies a plurality of reference signals having different gradients to the selection circuit 108. An example of the reference signals is a signal having a potential that changes with time such as a ramp signal having a potential that changes in a sloping manner More specifically, the reference signal generation unit 103 supplies a ramp signal VRMPL and a ramp signal VRMPH having a gradient larger than that of the ramp signal VRMPL to the selection circuit 108. In the description below, the ramp signal is used as the reference signal, but the reference signal is not limited to the ramp signal. For example, the plurality of reference signals having different gradients only need to be a plurality of signals having different amounts of change in potential per unit time, and include a signal having a potential that changes after being held at a predetermined potential value for predetermined time. A node that outputs the ramp signal VRMPL is referred to as a node VRMPL, and a node that outputs the ramp signal VRMPH is referred to as a node VRMPH.

The selection circuit 108 is supplied with the ramp signals VRMPL and VRMPH from the reference signal generation unit 103. The selection circuit 108 selects one of the ramp signals VRMPL and VRMPH and outputs the selected ramp signal to the comparator 104. A ramp signal output from the selection circuit 108 to the comparator 104 is referred to as a ramp signal VRMPI. The ramp signal VRMPI is input to the comparator 104. As described above, an amount of change in potential of the ramp signal VRMPL with time is smaller than that of the ramp signal VRMPH. In the present exemplary embodiment, the gradient of the ramp signal VRMPL is one-quarter of the gradient of the ramp signal VRMPH.

A clock signal is input from a non-illustrated timing generator to a counter 105. The counter 105 generates a count signal obtained by counting the clock signal.

The comparator 104 in each column is electrically connected to a memory 106 in each column so that the output CMPO from the comparator 104 in each column is input to the memory 106 in each column. The memory 106 in each column holds the count signal generated by the corresponding counter 105 at timing when the output from the comparator 104 is inverted.

One analog to digital conversion unit 200 (hereinafter referred to as AD conversion unit 200) includes one comparator 104, one selection circuit 108, and one memory 106. At least the reference signal generation unit 103 and the AD conversion unit 200 constitute a control circuit. While each of a plurality of AD conversion units 200 is arranged in correspondence with each column of the pixels 100 in FIG. 1A, the arrangement is not limited thereto. For example, a case is cited where a first pixel 100 and a second pixel 100 are arranged in the same column, and a first AD conversion unit 200 corresponding to the first pixel 100 and a second AD conversion unit 200 corresponding to the second pixel 100 perform AD conversion at the same period. Such configuration can also prevent degradation of image quality.

Figure 1B:
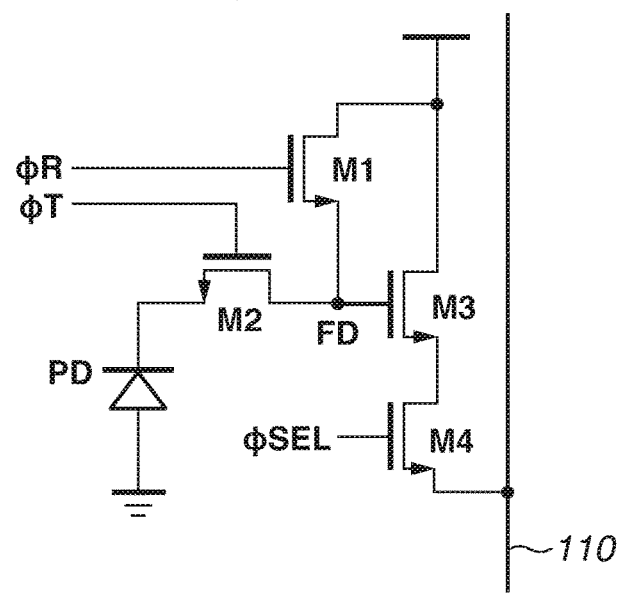

FIG. 1B is a diagram illustrating a configuration of each of the pixels 100. The pixel 100 includes a photodiode PD, a reset transistor M1, a transfer transistor M2, an amplification transistor M3, and a selection transistor M4. A signal φR is input from the vertical scanning circuit 102 to a gate of the reset transistor M1. A signal φT is input from the vertical scanning circuit 102 to a gate of the transfer transistor M2. A signal φSEL is input from the vertical scanning circuit 102 to a gate of the selection transistor M4. A power source potential VDD is input to one of a source and a drain of the reset transistor M1 and one of a source and a drain of the amplification transistor M3. The other of the source and the drain of the reset transistor M1, one of a source and a drain of the transfer transistor M2, and a gate of the amplification transistor M3 are electrically connected to a node FD. The other of the source and the drain of the transfer transistor M2 is electrically connected to the photodiode PD.

The other of the source and the drain of the amplification transistor M3 is electrically connected to one of a source and a drain of the selection transistor M4. The other of the source and the drain of the selection transistor M4 is electrically connected to the vertical signal line 110. The amplification transistor M3, a non-illustrated current source electrically connected to the vertical signal line 110, and the power source potential VDD constitute a source follower circuit.

Figure 2:
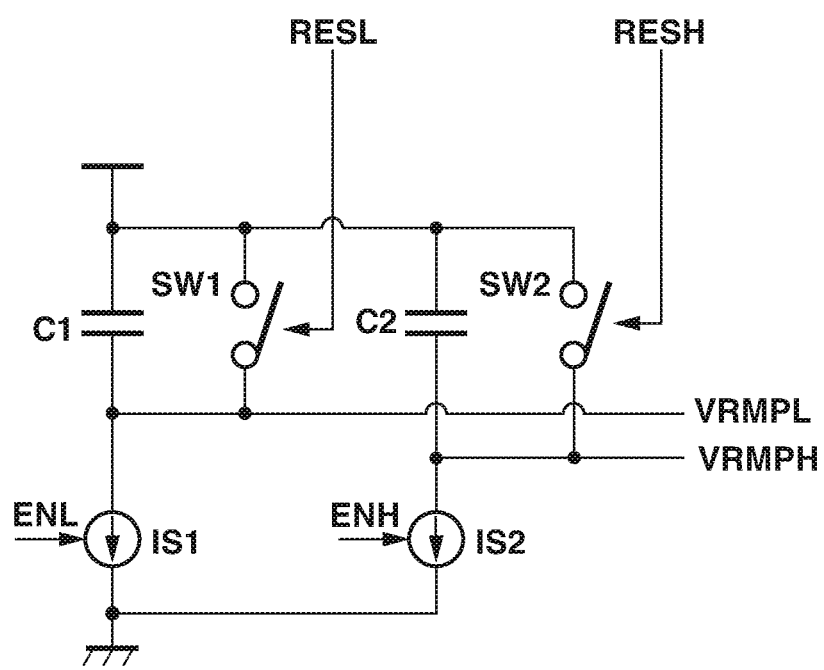
FIG. 2. is a circuit diagram illustrating a reference signal generation unit according to the first exemplary embodiment.

FIG. 2. illustrates a specific configuration of the reference signal generation unit 103 according to the present exemplary embodiment. In FIG. 2, a current source IS1, a capacitor C1, and a switch SW1 are connected to the node VRMPL. A current source IS2, a capacitor C2, and a switch SW2 are connected to the node VRMPH. Enable signals ENL and ENH individually control turning on and off of currents of the current sources IS1 and IS2, respectively. More specifically, the enable signal ENL switches, based on a signal level thereof, between states where the current of the current source IS1 flows through the node VRMPL and where the current of the current source IS1 does not flow through the node VRMPL. Similarly, the enable signal ENH switches, based on the signal level thereof, between states where the current from the current source IS2 flows through the node VRMPH and where the current from the current source IS2 does not flow through the node VRMPH.

Terminals of the switches SW1 and SW2 on an opposite side of terminals thereof connected to nodes outputting the ramp signals VRMPL and VRMPH, respectively, are connected to a power source. At the time of a reset operation of the node VRMPL, a control signal RESL for bringing the switch SW1 into a conductive state is applied to the switch SW1. At the time of a reset operation of the node VRMPH, a control signal RESH for bringing the switch SW2 into a conductive state is applied to the switch SW2.

In the present exemplary embodiment, the gradient of the ramp signal VRMPL is one-quarter of the gradient of the ramp signal VRMPH as described above. For example, by setting a capacitance value of the capacitor C1 and a capacitance value of the capacitor C2 to be equal and setting an amount of current flowing through the current source IS1 to be one-quarter of an amount of current flowing through the current source IS2, the gradient of the ramp signal VRMPL can be made one-quarter of the gradient of the ramp signal VRMPH. Alternatively, by setting the amount of current flowing through the current source IS1 and the amount of current flowing through the current source IS2 to be equal and setting the capacitance value of the capacitor C1 to be four times the capacitance value of the capacitor C2, the gradient of the ramp signal VRMPL can be made one-quarter of the gradient of the ramp signal VRMPH.

Figure 3:
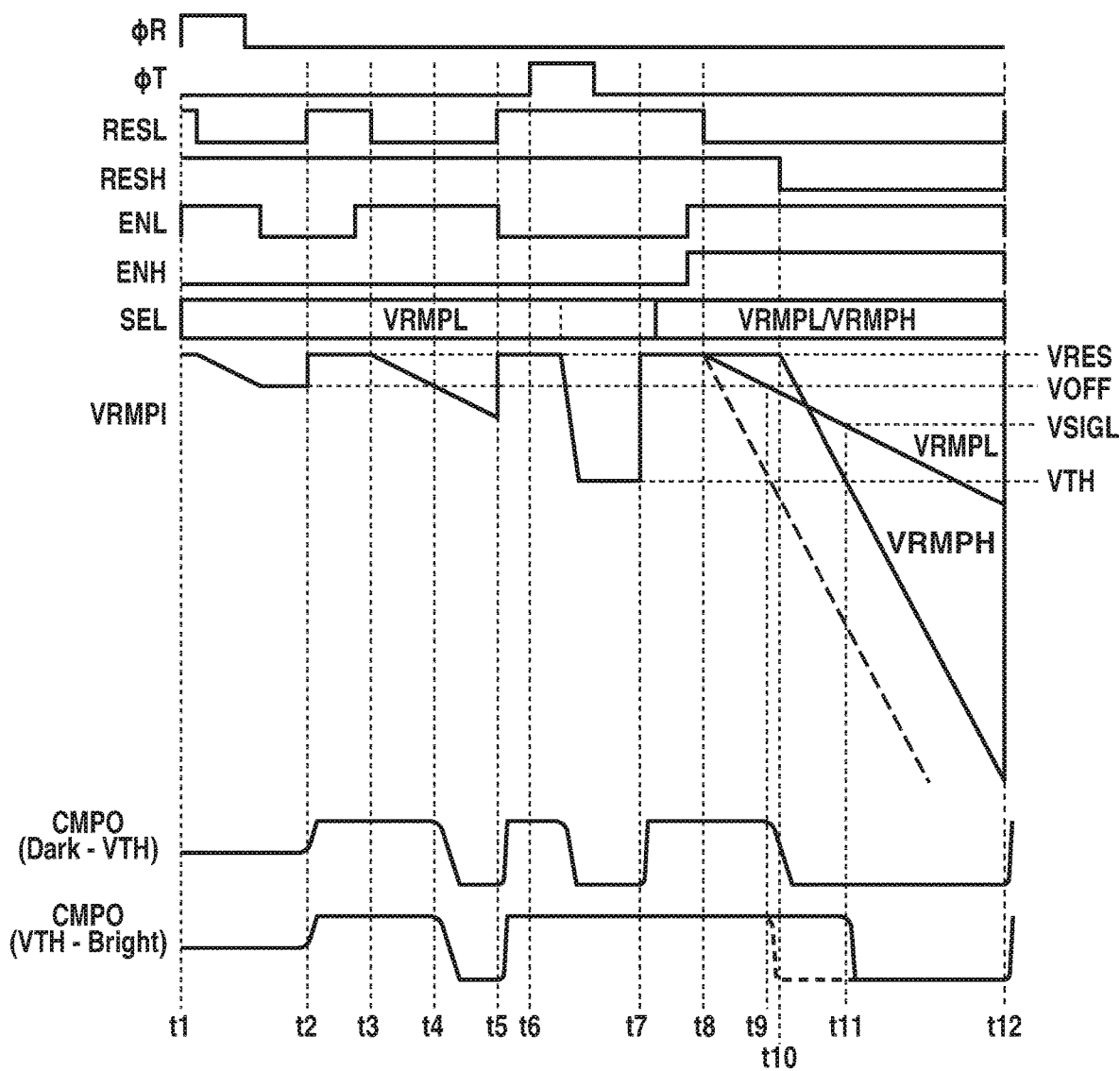
FIG. 3 is a timing chart illustrating a readout operation of the photoelectric conversion apparatus.

FIG. 3 is a timing chart illustrating a readout operation according to the present exemplary embodiment. FIG. 3 illustrates an operation related to the pixels 100 arranged in one row among the pixels 100 arranged in the plurality of rows illustrated in FIG. 1A. The pixels 100 arranged in one row include at least the first pixel 100 and the second pixel 100.

While illustration of the signal φSEL is omitted in FIG. 3, the vertical scanning circuit 102 causes a signal level of the signal φSEL output to the selection transistor M4 in each of the pixels 100 in one row to be at a high level (herein after referred to as Hi) from time t1 to time t12. Thus, the selection transistor M4 is in an on-state from the time t1 to the time t12. The signals φR and φT illustrated in FIG. 3 correspond to the respective signals φR and φT illustrated in FIG. 1B. The ramp signal VRMPI illustrated in FIG. 3 is the ramp signal output from the selection circuit 108 to the comparator 104.

In FIG. 3, SEL represents which of the ramp signal VRMPL and the lamp VRMPH is selected as a ramp signal corresponding to the ramp signal VRMPI by the selection circuit 108. In FIG. 3, two patterns of the output CMPO from the comparator 104 are illustrated. The output CMPO (Dark to VTH) represents a case where a target of image-capturing is dark, i.e., a level of an output signal from the pixel 100 based on light incident on the photodiode PD is lower than a difference (VTH−VOFF) between a comparative level VTH and a reference level (offset level) VOFF, which will be described below. The output CMPO (VTH to Bright) represents a case where the target of image-capturing is bright, i.e., a level of the output signal from the pixel 100 based on light incident on the photodiode PD is higher than the difference (VTH−VOFF) between the comparative level VTH and the reference level VOFF.

The signal φR becomes Hi from the time t1 to the time t2 so that the reset transistor M1 resets a potential of the node FD to be a potential based on the power source potential VDD. Subsequently, the signal φR becomes a low level (hereinafter referred to as Lo) to turn off the reset transistor M1, thereby canceling the reset of the node FD. The amplification transistor M3 outputs a signal based on the potential of the node PD, the reset of which has been canceled, to the vertical signal line 110 through the selection transistor M4. The signal at this time is referred to as an N signal, and a potential level of the N signal is referred to as VN.

The selection circuit 108 outputs the ramp signal VRMPL as the ramp signal VRMPI from the time t1 to the time t2. In the reference signal generation unit 103, the enable signal ENL becomes Hi so that a current flows through the current source IS1. At this time, the current flows from the power source toward the current source IS1 through the switch SW1, which is in the on state. At this time, the node VRMPL is fixed to a reset potential VRES based on the power source potential. Subsequently, the control signal RESL becomes Lo, and the switch SW1 of the reference signal generation unit 103 is turned off, so that an electric charge of the capacitor C1 is extracted from the current source IS1. By this operation, a potential of the ramp signal VRMPL is changed from the reset potential VRES in a negative direction at a constant gradient. Subsequently, the enable signal ENL becomes Lo, and a change in the potential of the ramp signal VRMPL stops. The potential at this time is referred to as the offset level VOFF. Subsequently, the comparator 104 performs a clamping (auto-zero) operation to acquire the N signal based on the offset level VOFF by the time t2.

At the time t2, the control signal RESL becomes Hi so that the ramp signal VRMPL is reset to the reset potential VRES. Then, the output CMPO becomes Hi. At this point in time, whether the output CMPO becomes Hi or Lo depends on a configuration of the comparator 104. In the present exemplary embodiment, the description continues below on the premise that the output CMPO becomes Hi.

Immediately before the time t3, the enable signal ENL becomes Hi, and the current flows through the current source IS1, so that a first round of an AD conversion operation, which will be described below, is prepared.

The first round of the AD conversion operation is performed from the time t3 to the time t5. The control signal RESL becomes Lo, and the potential of the ramp signal VRMPL starts to change at a constant gradient. In addition, the counter 105 starts counting. When the potential of the ramp signal VRMPL reaches the offset level VOFF at the time t4, a magnitude relationship between levels of two signals VRMPI and VIN input to the comparator 104 is inverted, and the output CMPO changes to Lo. A change in the output CMPO at this time triggers the memory 106 to acquire a count value at this point in time as a digital signal. The digital signal at this time is referred to as an NAD signal.

At the time t5, the control signal RESL becomes Hi, and the enable signal ENL becomes Lo, so that the ramp signal VRMPL is reset, and the output CMPO becomes Hi.

From time t6 to time t7, by turning ON the transfer transistor M2 in a period during which the signal φT is Hi, an electric charge accumulated in the photodiode PD is transferred to the node FD. The amplification transistor M3 outputs a signal based on the potential of the node FD to the vertical signal line 110 via the selection transistor M4. The signal output from the amplification transistor M3 to the vertical signal line 110 is referred to as an S signal, and a potential level of the S signal is referred to as VS. The S signal is an optical signal generated by photoelectric conversion in the pixel 100.

In the period, the node VRMPL outputs the comparative potential level (comparative level) VTH for comparing a level of the S signal. As a method for achieving the comparative level VTH, for example, the node VRMPL is connected to a non-illustrated current source for generating the comparative level, so that a high current flows through the node VRMPL in this period. When an amount of change (VS−VN) from a potential level of the N signal to a potential level of the S signal in the vertical signal line 110 is smaller than the difference (VTH−VOFF) between the comparative level VTH and the reference level VOFF (Dark to VTH), the output CMPO is inverted to Lo. When the amount of change (VS−VN) is larger than the difference (VTH−VOFF) between the comparative level VTH and the reference level VOFF (VTH to Bright), the output CMPO does not change and remains to be Hi. Such a comparison operation is performed for each column, and a result of the comparison operation for each column is stored in the memory 106. More specifically, the result of the comparison operation indicating whether the output CMPO is Hi or Lo is input to the memory 106. The result of the comparison operation is also input to the selection circuit 108.

In one embodiment, the comparative level VTH is set to be higher than the potential of the ramp signal VRMPL at the end of the potential change of the ramp signal VRMPL. With such a configuration, the comparison operation can be performed by comparing a pixel signal with either the ramp signal VRMPL or the ramp signal VRMPH.

From time t7 to time t8, the ramp signal VRMPI to be output from the selection circuit 108 is selected based the result of the comparison operation. If an amplitude of the pixel signal is a predetermined value or smaller, the selection circuit 108 selects the ramp signal VRMPL as the ramp signal VRMPI. If the amplitude of the pixel signal is larger than the predetermined value, the selection circuit 108 selects the ramp signal VRMPH as the ramp signal VRMPI. In other words, the selection circuit 108 outputs the ramp signal VRMPL as the ramp signal VRMPI if the output CMPO is Lo, and the selection circuit 108 outputs the ramp signal VRMPH as the ramp signal VRMPI if the output CMPO is Hi. The selection circuit 108 selects one of the ramp signal VRMPH and the ramp signal VRMPL having different gradients based on the difference between the comparative level VTH and the reference level VOFF.

Immediately before the time t8, the enable signals ENL and ENH become Hi. Thus, the current of the current source IS1 flows through the node VRMPL, and the current of the current source IS2 flows through the node VRMPH, so that a second round of the AD conversion operation, which will be described below, is prepared.

The second round of the AD conversion operation is performed from the time t8 to the time t11.

From now on, a case where the result of the comparison operation is Lo (Dark to VTH) and a case where the result of the comparison operation is Hi (VTH to Bright) will be separately described.

The case where the result of the comparison operation is Lo (Dark to VTH) is a case where, for example, the comparison operation is performed with respect to a signal from the first pixel in which no light is incident on the photodiode PD or an amount of light incident on the photodiode PD is a constant value or smaller. In the comparator 104 that outputs Lo as the result of the comparison operation, the potential of the ramp signal VRMPL changes in a first period from a first time (time t8) to a second time (time t12).

In the example illustrated in FIG. 3, the S signal in the vertical signal line 110 to which the corresponding pixel 100 is connected is at the same level as that of the N signal. Thus, at the time t9 when the potential of the ramp signal VRMPL reaches the reference level VOFF, i.e., when an amount of change in the potential of the ramp signal VRMPL reaches a difference (VRES−VOFF), the output CMPO is inverted to be Lo. If a pixel signal has such an amplitude that an amount of change (VS−VN) of the pixel signal is larger than the difference (VRES−VOFF) and smaller than the difference (VTH−VOFF), the output CMPO is inverted to be Lo at any timing from the time t9 to the time t12 when the ramp signal VRMPL reaches a difference (VRES−(VS−VN)−VOFF). At this time, the brighter the S signal is, the later a time at which the output CMPO is inverted to be Lo is. A change in the output CMPO at this time triggers the memory 106 to acquire a count value at this point in time as a digital signal. The digital signal at this time is referred to as an SADL signal.

The case where the result of the comparison operation is Hi (VTH to Bright) is a case where, for example, the comparison operation is performed with respect to a signal from the second pixel in which an amount of light incident on the photodiode PD is larger than a constant value. In the comparator 104 that outputs Hi as the result of the comparison operation, the potential of the ramp signal VRMPH changes in a second period from a third time (time t10) to a fourth time (time t12). In this manner, the third time is set to be later than the first time. Further, the first period and the second period partially overlap with each other. In the case where the result of the comparison operation is Hi, if a column to which the corresponding pixel 100 is connected is a bright column in which the pixel signal has such an amplitude that the amount of change (VS−VN) of the pixel signal is equivalent to the difference (VTH−VOFF), the output CMPO is inverted to be Lo at the time t11 when the potential of the ramp signal VRMPH reaches VTH from VRES. Although an exception can occur due to an influence of noise or the like, the output CMPO is normally not inverted before the time t11 because the amount of change (VS−VN) of the pixel signal is larger than the difference (VTH−VOFF) when the ramp signal VRMPH is selected. The larger the amount of change (VS−VN) of the pixel signal is, the later a time at which the output CMPO is inverted to be Lo after the time t11 is. A change in the output CMPO at this time triggers the memory 106 to acquire a count value at this point in time as a digital signal. The digital signal at this time is referred to as an SADH signal.

At the time t12, the control signals RESL and RESH become Hi, and the enable signals ENL and ENH become Lo, so that the ramp signals VRMPL and VRMPH are reset, and the output CMPO becomes Lo.

In the present exemplary embodiment, in the second round of the AD conversion from the time t8 to the time t11, the third time at which the potential of the ramp signal VRMPH starts to change is set later than the first time at which the potential of the ramp signal VRMPL starts to change. More specifically, in the comparator 104 included in the first AD conversion unit 200 that performs AD conversion of the signal from the first pixel 100, the control signal RESL becomes Lo at the time t8, so that the potential of the ramp signal VRMPL starts to change. Further, in the comparator 104 included in the second AD conversion unit 200 that performs AD conversion of the signal from the second pixel 100, the control signal RESH becomes Lo at the time t10, so that the potential of the ramp signal VRMPH starts to change later than the change of the potential of the ramp signal VRMPL. In this manner, by shifting starting points in time at which the potentials of the ramp signals are changed in the AD conversion units 200 that perform AD conversion in the same period, noise such as a horizontal smear can be reduced. A mechanism thereof will be described in detail below.

As a comparative example, a case is described where the ramp signals VRMPL and VRMPH start to change at the same time, which may cause the following issue. A broken line in the row of VRMPI illustrated in FIG. 3 represents change in the potential of the ramp signal VRMPH according to a comparative example.

As described above, the potential of the comparative level VTH is made higher than the potential of the ramp signal VRMPL at the end of the change in the potential of the ramp signal VRMPL. A case will be considered where a comparison is made using a pixel signal from a pixel in which an amount of light incident on the photodiode PD is larger than a constant value, and the ramp signal VRMPH. Depending on the pixel signal, the output CMPO from the comparator 104 using the ramp signal VRMPH may be inverted at almost the same time as the time t9 at which the output CMPO from the comparator 104 using the ramp signal VRMPL is inverted. An inversion state of the output CMPO in such a case is indicated by a broken line in the row of CMPO (VTH to Bright).

Subsequently, the influence of kickback noise will be considered. If the potential of the ramp signal VRMPH starts to change simultaneously with the start of change in the potential of the ramp signal VRMPL, the kickback noise from a column to which the ramp signal VRMPH is input occurs at almost the same time as the time t9, which is the time when the output CMPO from the comparator 104 of a dark column, to which the ramp signal VRMPL is input, is inverted. This affects the inversion operation of the dark column, and the output CMPO from the comparator 104 can be inverted at different timing from original timing. In a case where a pixel signal having an amplitude larger than or equal to the difference (VTH−VOFF) is input to some of the columns, AD conversion is performed on the pixel signals having different values compared to a case where all the columns are dark columns. This may cause degradation of image quality such as streaks in which dark parts on both sides of a bright part are captured as having brightness different from original brightness in an image.

On the other hand, if the start of the change in the potential of the ramp signal VRMPH is delayed, inversion timing of the column to which the ramp signal VRMPH is input becomes the time t11 or later. This is because, when the ramp signal VRMPH is selected, the output CMPO is normally not inverted until an amount of change in the potential of the ramp signal VRMPH reaches the difference (VTH−VOFF), as described above. In this case, an amplitude of a signal in the column to which the ramp signal VRMPL is input is equivalent to a difference (VSIGL−VOFF). This is a level brighter than the dark level. In the photoelectric conversion apparatus having the photodiode PD, in principal, optical shot noise that is an optical signal amplitude to the half power is added to the pixel signal. Thus, at this level, the influence of the kickback noise is made relatively smaller than that at the dark level.

The comparator 104 having a narrow band results in a longer period of AD conversion, thereby increasing readout time of the photoelectric conversion apparatus. Thus, the comparator 104 is typically designed not to have an unnecessarily narrow band. For this reason, the gradient of the ramp signal serving as an input signal of the comparator 104 may affect a waveform of the output CMPO. When the gradient of the ramp signal is large, inversion speed of the output CMPO increases, whereby the waveform of the output CMPO becomes steep. In contrast, when the gradient of the ramp signal is small, the inversion speed of the output CMPO decreases, whereby the waveform of the output CMPO becomes gentle. In other words, the waveform of the output CMPO from the comparator 104 to which the ramp signal VRMPH is input is steeper than the waveform of the output CMPO from the comparator 104 to which the ramp signal VRMPL is input. The steeper the waveform of the output CMPO is, the larger the kickback noise that can enter another comparator 104 becomes. Thus, the kickback noise from the comparator 104 to which the ramp signal VRMPH is input is larger than the kickback noise from the comparator 104 to which the ramp signal VRMPL is input. In particular, the kickback noise is likely to occur in a case where the comparator 104 to which the ramp signal VRMPL is input and the comparator 104 to which the ramp signal VRMPH is input are arranged adjacent to each other.

The starting time of change in the potential of the ramp signal VRMPH will be described below. The smaller the amplitude of an optical signal is, the more susceptible to the kickback noise the comparator 104 becomes. Thus, the starting time of change in the potential of the ramp signal VRMPH is set so that an intersection of the comparative level VTH and the ramp signal VRMPH becomes later than the time t9, which is the time when the amount of change in the potential of the ramp signal VRMPL reaches the difference (VRES−VOFF). The third time t10 at this time is expressed by the following inequality:

$$T10 > VTH/SL2 \cdot VOFF/SL1$$

In the inequality, the gradient of the ramp signal VRMPL is represented by SL1, and the gradient of the ramp signal VRMPH is represented by SL2. Since the period of AD conversion ends at the time t12, the ramp signal VRMPH starts to change at an appropriate time so that a difference between the level of the ramp signal VRMPH and the comparative level VTH at the time 12 becomes a value in a necessary AD conversion range or above. The necessary AD conversion range of the ramp signal VRMPH is SL2/SL1 times an AD conversion range of the ramp signal VRMPL, and can be expressed by the following inequality:

$$VH - VTH > SL2/SL1 \times (VL - VOFF)$$

In the inequality, a total amplitude of the ramp signal VRMPH from the time t10 to the time t12 is represented by VH, and a total amplitude of the ramp signal VRMPL from the time t8 to the time t12 is represented by VL.

At the time t12 or later, the NAD signal, the SADL signal, and the SADL signal, which are digital signals, and the result of the comparison operation are output from the memory 106 to a subsequent signal processing circuit, and then the signal processing circuit executes correlated double sampling (CDS) processing.

The CDS processing executed by the subsequent signal processing circuit will be described below. Details of the CDS processing are described in Japanese Patent Application Laid-Open No. 2013-229852, and thus only a brief description thereof will be given below. In the present exemplary embodiment, AD conversion processing is executed using two signals, i.e., the ramp signals VRMPL and VRMPH, having gradients at a ratio of 1 to 4. Thus, a gain in the AD conversion using the ramp signal VRMPL is four times higher than that using the ramp signal VRMPH. Thus, the following CDS processing is executed after the gains in the AD conversion are made equal.

If the result of the comparison operation is Lo, the following expression is satisfied: SADL−NAD If the result of the comparison operation is Hi, the following expression is satisfied: 4×SADH−NAD The subsequent signal processing circuit also executes correction processing. Details of the correction processing are described in Japanese Patent Application Laid-Open No. 2013-229852, and thus only a brief description thereof will be given below. When combining a result of the AD conversion using the ramp signal VRMPL and a result of the AD conversion using the VRMPH, the signal processing circuit executes two types of correction processing to maintain linearity. One is a gradient correction to correct an error from an ideal gradient ratio between the ramp signal VRMPL and the ramp signal VRMPH (in the present exemplary embodiment, 1:4), and the other is a level difference correction to correct a difference in level that occurs near a level (VTH−VOFF) at which selection of the ramp signal is switched.

In the present exemplary embodiment, to delay the starting time of change in the potential of the ramp signal VRMPH, a fixed offset value (digital value) expressed by the following expression is superimposed on the SADH signal.

$$S(RMPH)/S(RMPL) \times (\text{time } t11 - \text{time } t9)/f(\text{counter})$$

In this expression, S(RMPH) represents the gradient of the ramp signal VRMPH, S(RMPL) represents the gradient of the ramp signal VRMPL, and f(counter) represents a count frequency of the counter 105. The signal processing circuit may execute correction by superimposing the offset value on a value of the level difference correction described above.

Figure 4:
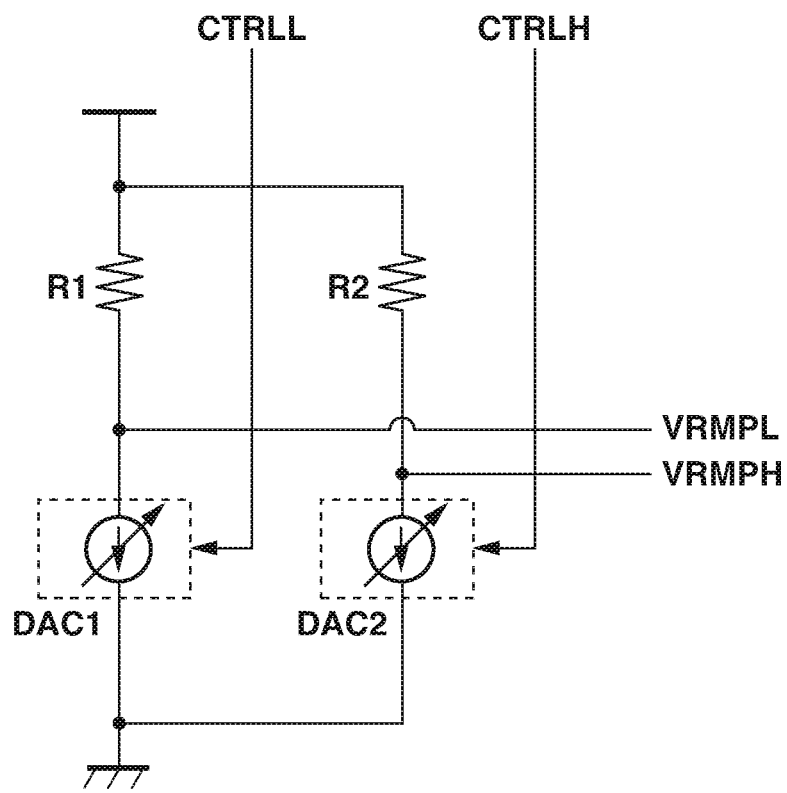
FIG. 4. is a circuit diagram illustrating a reference signal generation unit according to a second exemplary embodiment.

Next, a configuration example of a reference signal generation unit 103 according to a second exemplary embodiment will be described with reference to FIG. 4. The description below will be given mainly of points different from those of the first exemplary embodiment.

A current source DAC1 and a resistor R1 are connected to the node VRMPL in the reference signal generation unit 103 according to the present exemplary embodiment. A current source DAC2 and a resistor R2 are connected to the node VRMPH. Operation of the current sources DAC1 and DAC2 is individually controlled by the control signals CTRLL and CTRLH, respectively. For example, when the control signal CTRLL is supplied to the current source DAC1, a current from the current source DAC1 flows through the node VRMPL. When the control signal CTRLH is turned OFF, the current from the current source DAC1 does not flow through the node VRMPL. Similarly, when the control signal CTRLH is supplied to the current source DAC2, a current from the current source DAC2 flows through the node VRMPH. When the control signal CTRLH is turned OFF, the current from the current source DAC2 does not flow through the node VRMPH.

For example, in a case where the current sources DAC1 and DAC2 are configured to control an amount of current based on a count value of a non-illustrated counter (different from the counter 105) that counts a supplied clock frequency, the control signals CTRLL and CTRLH are clock signals. For example, in a period in which the second AD conversion is executed, time to start supplying a clock signal serving as the control signal CTRLH to the current source DAC2 is set to be later than time to start supplying a clock signal serving as the control signal CTRLL to the current source DAC1. In other words, in the period in which the second AD conversion is executed, time to turn on the current source DAC2 is set to be later than time to turn on the current source DAC1. Such a configuration can make the starting time of change in potential of the ramp signal VRMPH to be later than the starting time of change in potential of the ramp signal VRMPL.

A configuration may be employed in which an amount of current of the current source DAC1 and an amount of current of the current source DAC2 are set to be equal at the same count value and resistance of the resistor R1 is set to be one-quarter of resistance of the resistor R2, so that the gradient of the ramp signal VRMPL becomes one-quarter of the gradient of the ramp signal VRMPH. Alternatively, a configuration may be employed in which the resistance of the resistor R1 and the resistance of the resistor R2 are set to be equal, and the amount of current of the current source DAC1 is set to be one-quarter of the amount of current of the current source DAC2 at the same count value. Alternatively, a configuration may be employed in which the resistance of the resistor R1 and the resistance of the resistor R2 are set to be equal, the amount of current of the current source DAC1 and the amount of current of the current source DAC1 are set to be equal at the same count value, and a count speed of the current source DAC1 is set to be one-quarter of a count speed of the current source DAC2. In such a configuration, a frequency of a count CLK input to the current source DAC1 can be set to one-quarter of a count CLK input to the current source DAC2, or a ramp counter included in the current source DAC1 can count every four cycles of the count CLK.

The reference signal generation unit 103 according to the present exemplary embodiment can achieve substantially the same operation as that described in the first exemplary embodiment even though the signals may be different in name and polarity from those in the first exemplary embodiment.

Figure 5:
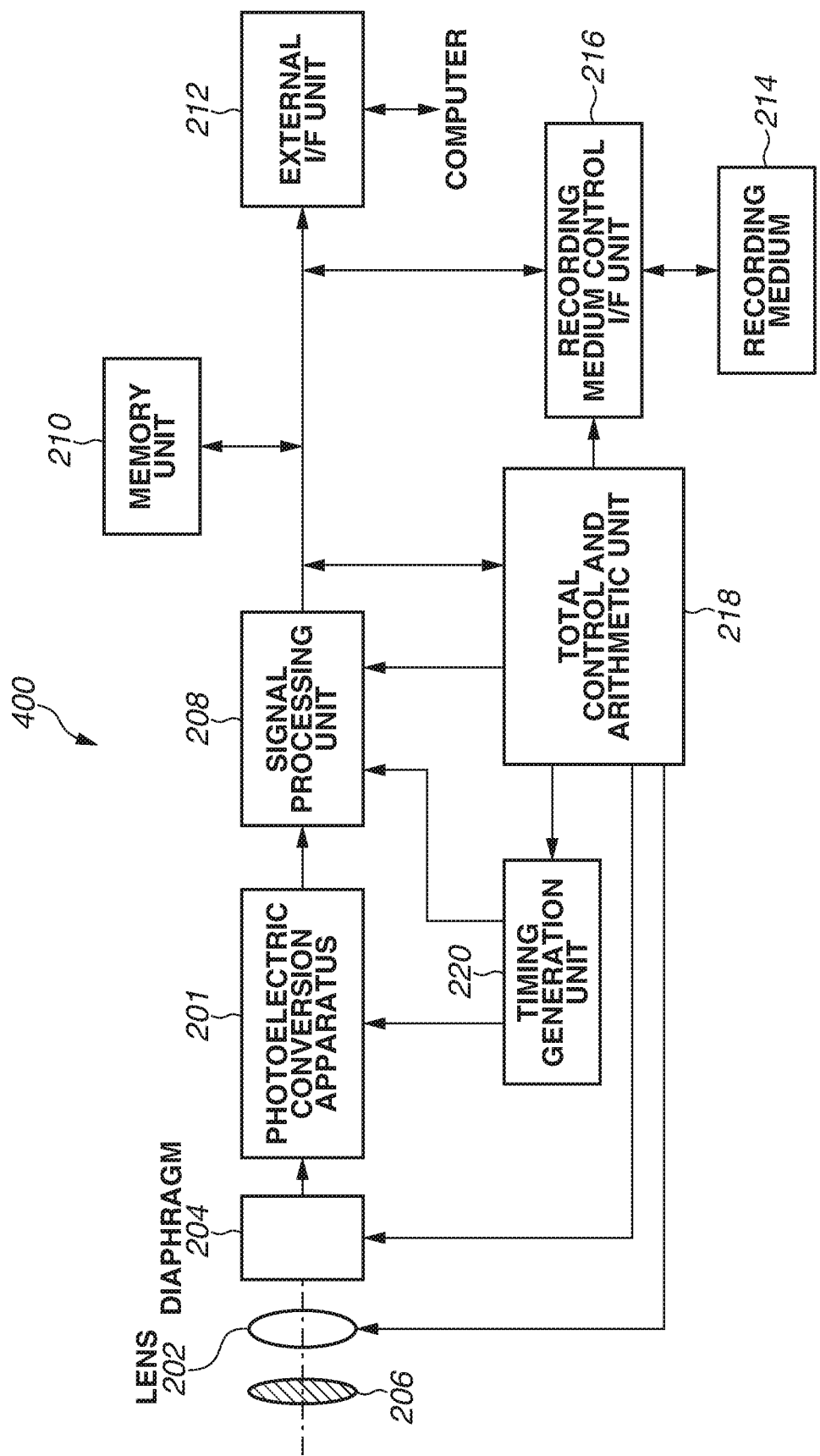
FIG. 5 is a block diagram schematically illustrating a configuration of a photoelectric conversion system according to a third exemplary embodiment.

A photoelectric conversion system according to a third exemplary embodiment will be described below with reference to FIG. 5. The same component as that of the photoelectric conversion apparatus according to the first or second exemplary embodiment will be designated by the same reference numeral, and a description thereof will be omitted or abbreviated. FIG. 5 is a block diagram schematically illustrating a configuration of the photoelectric conversion system according to the present exemplary embodiment.

The photoelectric conversion apparatus described in each of the first and second exemplary embodiments can be applied as a photoelectric conversion apparatus 201 illustrated in FIG. 5 to various photoelectric conversion systems. Examples of the photoelectric conversion system to which the photoelectric conversion apparatus can be applied include a digital still camera, a digital camcorder, a monitoring camera, a copy machine, a facsimile machine, a mobile phone, an in-vehicle camera, and an observation satellite. A camera module including an optical system such as a lens and the photoelectric conversion apparatus is also among the examples of the photoelectric conversion system. FIG. 5 illustrates a block diagram of a digital still camera as one example of the photoelectric conversion system.

A photoelectric conversion system 400 illustrated in FIG. 5 includes the photoelectric conversion apparatus 201, a lens 202 that forms an optical image of a target object on the photoelectric conversion apparatus 201, a diaphragm 204 to make an amount of light passing through the lens 202 variable, and a barrier 206 to protect the lens 202. The lens 202 and the diaphragm 204 constitute an optical system for concentrating light onto the photoelectric conversion apparatus 201. The photoelectric conversion apparatus 201 is the photoelectric conversion apparatus according to any one of the first and second exemplary embodiments, and converts the optical image formed by the lens 202 into image data.

The photoelectric conversion system 400 further includes a signal processing unit 208 that executes processing on an output signal output from the photoelectric conversion apparatus 201. The signal processing unit 208 executes the CDS processing and the correction processing described above.

The photoelectric conversion system 400 further includes a memory unit 210 to temporarily store image data, and an external interface unit (external I/F unit) 212 to communicate with an external computer or the like. The photoelectric conversion system 400 further includes a recording medium 214 such as a semiconductor memory, and a recording medium control interface unit (recording medium control I/F unit) 216. The recording medium 214 records or reads out captured image data. The recording medium control I/F unit 216 controls the recording to or the readout from the recording medium 214. The recording medium 214 may be built in the photoelectric conversion system 400 or may be attachable to and detachable from the photoelectric conversion system 400.

The photoelectric conversion system 400 further includes a total control and arithmetic unit 218 and a timing generation unit 220. The total control and arithmetic unit 218 performs various arithmetic computations and controls the whole of the digital still camera. The timing generation unit 220 outputs various timing signals to the photoelectric conversion apparatus 201 and the signal processing unit 208. The timing signals may be input from the outside. Thus, the photoelectric conversion system 400 includes at least the photoelectric conversion apparatus 201, and the signal processing unit 208 that performs processing on the output signal output from the photoelectric conversion apparatus 201.

The photoelectric conversion apparatus 201 outputs an imaging signal to the signal processing unit 208. The signal processing unit 208 executes predetermined signal processing on the imaging signal output from the photoelectric conversion apparatus 201, and outputs image data. The signal processing unit 208 generates an image using the imaging signal.

The photoelectric conversion system capable of stably acquiring a high-sensitivity and high-quality image having a high saturation signal value can be achieved by applying the photoelectric conversion apparatus according to any of the first to third exemplary embodiments described above to the photoelectric conversion system.

A photoelectric conversion system and a mobile object according to a fourth exemplary embodiment will be described below with reference to FIGS. 6A and 6B.

Figure 6A:
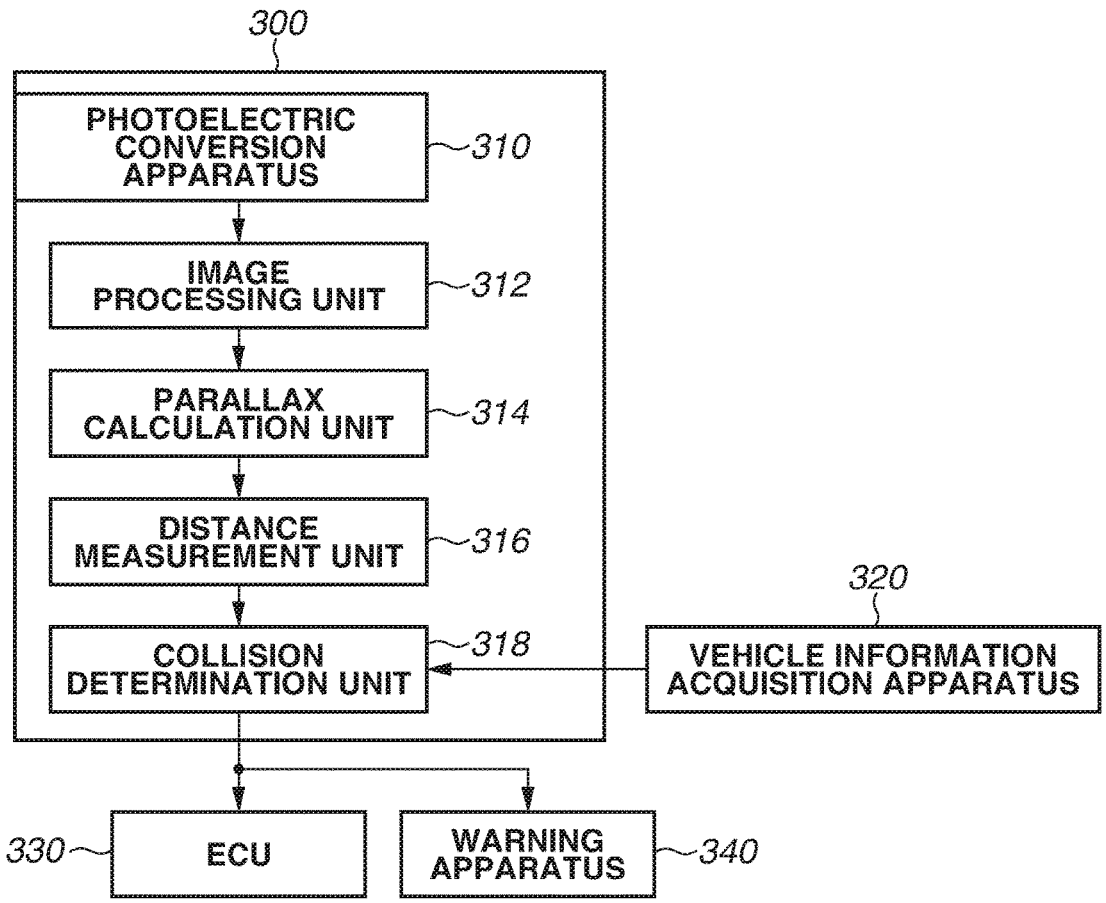
FIGS. 6A and 6B are diagrams each illustrating a configuration example of a photoelectric conversion system and a mobile object according to a fourth exemplary embodiment.
Figure 6B:
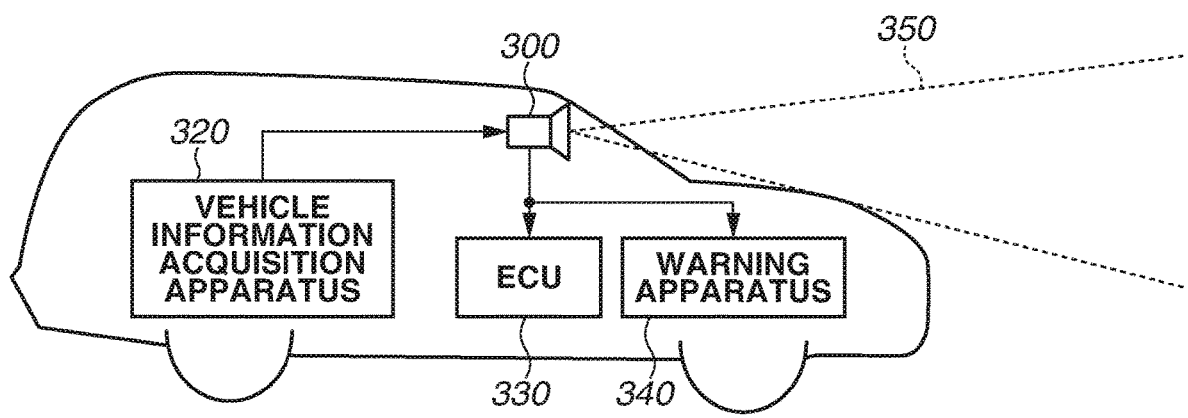

FIG. 6A illustrates an example of the photoelectric conversion system related to an in-vehicle camera. A photoelectric conversion system 300 includes a photoelectric conversion apparatus 310. The photoelectric conversion apparatus 310 is the photoelectric conversion apparatus according to any one of the first to third exemplary embodiments described above. The photoelectric conversion system 300 includes an image processing unit 312, and a parallax calculation unit 314. The image processing unit 312 executes image processing on a plurality of pieces of image data acquired by the photoelectric conversion apparatus 310. The parallax calculation unit 314 calculates parallax (phase difference in parallax images) from the plurality of pieces of image data acquired by the photoelectric conversion system 300. The photoelectric conversion system 300 further includes a distance measurement unit 316, and a collision determination unit 318. The distance measurement unit 316 calculates a distance to a target object based on the calculated parallax. The collision determination unit 318 determines whether there is a possibility of collision based on the calculated distance. The parallax calculation unit 314 and the distance measurement unit 316 are examples of a distance information acquisition means of acquiring distance information to the target object. More specifically, the distance information is information about parallax, a defocusing amount, and a distance to the target object. The collision determination unit 318 may use any such information to determine the possibility of collision. The distance information acquisition means may be implemented by a dedicatedly designed hardware component or a software module. The distance information acquisition means may be implemented by, for example, a field programmable gate array (FPGA) or an application specific integrated circuit (ASIC), or a combination of these circuits.

The photoelectric conversion system 300 is connected to a vehicle information acquisition apparatus 320, and can acquire vehicle information such as a vehicle speed, a yaw rate, and a rudder angle. The photoelectric conversion system 300 is connected to an electric control unit (ECU) 330 serving as a control device that outputs a control signal for generating braking force on a vehicle based on a result of the determination by the collision determination unit 318. The photoelectric conversion system 300 is also connected to a warning apparatus 340 that gives a warning to a driver based on the result of the determination by the collision determination unit 318. For example, if the result of the determination by the collision determination unit 318 indicates a high possibility of collision, the ECU 330 performs control of the vehicle to avoid the collision and prevent occurrence of damage by applying brakes, releasing a gas pedal, and reducing engine power output. The warning apparatus 340 gives a warning to a user by generating an alarm such as a sound displaying warning information on a screen of a car navigation system, and causing vibrations to a seat belt or a steering wheel.

In the present exemplary embodiment, the photoelectric conversion system 300 captures an image around the vehicle, for example, ahead of or behind the vehicle. FIG. 6B illustrates the photoelectric conversion system 300 in the case of capturing an image ahead of the vehicle (image-capturing range 350). The vehicle information acquisition apparatus 320 transmits an instruction for performing a predetermined operation to the photoelectric conversion system 300 or the photoelectric conversion apparatus 310. This configuration can further improve accuracy in measuring a distance.

While the description above has been given of the example of the control performed to avoid collision with another vehicle, the present embodiment can also be applied to control of self-driving by following another vehicle and control of self-driving by preventing lane departure. Further, the photoelectric conversion system is applicable not only to a vehicle such as an automobile, but also to a mobile object (mobile apparatus) such as a ship, an aircraft, and an industrial robot. Furthermore, application of the photoelectric conversion system is not limited to the application to the mobile object, and the photoelectric conversion system can also be applied to a wide range of apparatuses using object recognition such as an intelligent transportation system (ITS).

The disclosure is not limited to the above-described exemplary embodiments, and various modifications can be made. For example, the disclosure can employ an example in which part of the configuration of any one of the above-described exemplary embodiments is added to another one of the above-described exemplary embodiments or is replaced with part of the configuration of the other one of the above-described exemplary embodiments.

The above-described exemplary embodiments are merely specific examples of implementing the disclosure, and the technical scope of the disclosure should not be interpreted in a limited manner thereby. In other words, the disclosure can be implemented in various modes without departing from the technical idea or the principal features of the disclosure.

The disclosure can improve image quality while maintaining high accuracy in conversion of a pixel signal into a digital signal.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-114968, filed Jun. 20, 2019, which is hereby incorporated by reference herein in its entirety.

What is claimed is:

1. A photoelectric conversion apparatus, comprising:
a plurality of pixels including a first pixel and a second pixel;
a generation unit configured to generate a first reference signal changing in potential in a first period from a first point in time to a second point in time, and a second reference signal having a gradient larger than a gradient of the first reference signal and changing in potential in a second period from a third point in time to a fourth point in time; and
a plurality of analog to digital (AD) conversion units including a first AD conversion unit to which a signal from the first pixel is input, and a second AD conversion unit to which a signal from the second pixel is input,
wherein each of the plurality of AD conversion units includes a selection circuit configured to select the first reference signal or the second reference signal, and a comparator configured to compare the first reference signal or the second reference signal selected by the selection circuit with a signal from one of the pixels,
wherein the first period and the second period partially overlap with each other, and
wherein the third point in time is later than the first point in time.

2. The photoelectric conversion apparatus according to claim 1, wherein the fourth point in time is set before the second point in time is set.

3. The photoelectric conversion apparatus according to claim 2, wherein the first reference signal and the second reference signal change in a sloping manner.

4. The photoelectric conversion apparatus according to claim 1, wherein the first AD conversion unit and the second AD conversion unit are arranged adjacent to each other.

5. The photoelectric conversion apparatus according to claim 1,
wherein the comparator is configured to receive input of a comparative level signal with which a level of the signal from the pixel is compared,
wherein the comparator includes a first comparator and a second comparator,
wherein the first comparator is configured to compare the first reference signal with the signal from the pixel,
wherein the second comparator is configured to compare the second reference signal with the signal from the pixel, and
wherein the third point in time in comparison by the second comparator is set so that an intersection between the comparative level signal and the second reference signal occurs later than an intersection between an offset level signal and the first reference signal in comparison by the first comparator.

6. The photoelectric conversion apparatus according to claim 5,
wherein the third point in time is shifted from the first point in time by a predetermined time, and
wherein the signal from the pixel is subjected to AD conversion by the AD conversion unit, and the converted signal is corrected based on the following expression:

$$S(RMPH)/S(RMPL) \times (time\ t11 - time\ t9)/f(counter),$$

where $S(RMPH)$ represents the gradient of the second reference signal, $S(RMPL)$ represents the gradient of the first reference signal, the time t1 represents a time of the intersection between the comparative level signal and the second reference signal, the time t2 represents a time of the intersection between the offset level signal and the first reference signal, and f(counter) represents a count frequency.

7. The photoelectric conversion apparatus according to claim 1,
wherein the generation unit includes a first current source and a second current source,
wherein the first current source is connected to a first node configured to output the first reference signal, and
wherein the second current source is connected to a second node configured to output the second reference signal.

8. The photoelectric conversion apparatus according to claim 7, wherein an amount of current flowing through the first current source is smaller than an amount of current flowing through the second current source.

9. The photoelectric conversion apparatus according to claim 7, further comprising a first capacitor connected to the first current source and the first node, and a second capacitor connected to the second current source and the second node,
wherein a capacitance value of the first capacitor is larger than a capacitance value of the second capacitor.

10. The photoelectric conversion apparatus according to claim 7, further comprising:
a first switch configured to reset a potential of the first node; and
a second switch configured to reset a potential of the second node.

11. The photoelectric conversion apparatus according to claim 10,
wherein the first switch is turned off at the first point in time, and
wherein the second switch is turned off at the third point in time.

12. The photoelectric conversion apparatus according to claim 10,
wherein the first current source is turned on by being supplied with a first control signal,
wherein the second current source is turned on by being supplied with a second control signal, and
wherein a time to turn off the first switch is later than a time to supply the first control signal to the first current source and a time to supply the second control signal to the second current source.

13. The photoelectric conversion apparatus according to claim 1, wherein the selection circuit is configured to select the first reference signal in a case where an amplitude of the signal from the pixel is a predetermined value or smaller, and select the second reference signal in a case where the amplitude of the signal from the pixel is larger than the predetermined value.

14. A photoelectric conversion system comprising:
the photoelectric conversion apparatus according to claim 1; and
a signal processing unit configured to perform processing on a signal output from the photoelectric conversion apparatus.

15. A mobile object comprising:
the photoelectric conversion apparatus according to claim 1;
a distance information acquisition unit configured to acquire distance information about a distance to a target object from a parallax image based on a signal from the photoelectric conversion apparatus; and
a control unit configured to control the mobile object based on the distance information.

16. A control circuit, comprising:
a generation unit configured to generate a first reference signal changing in potential in a first period from a first point in time to a second point in time, and a second reference signal having a gradient larger than a gradient of the first reference signal and changing in potential in a second period from a third point in time to a fourth point in time; and
a plurality of analog to digital (AD) conversion units including a first AD conversion unit and a second AD conversion unit,
wherein each of the plurality of AD conversion units includes a selection circuit configured to select the first reference signal or the second reference signal, and a comparator to which the first reference signal or the second reference signal selected by the selection circuit is input,
wherein the first period and the second period partially overlap with each other, and
wherein the third point in time is later than the first point in time.

17. The control circuit according to claim 16,
wherein the generation unit includes a first current source and a second current source,
wherein the first current source is connected to a first node configured to output the first reference signal, and
wherein the second current source is connected to a second node configured to output the second reference signal.

18. The control circuit according to claim 17, wherein an amount of current flowing through the first current source is smaller than an amount of current flowing through the second current source.

19. The control circuit according to claim 17, further comprising a first capacitor connected to the first current source and the first node, and a second capacitor connected to the second current source and the second node,
wherein a capacitance value of the first capacitor is larger than a capacitance value of the second capacitor.

20. The control circuit according to claim 17, further comprising:
a first switch configured to reset a potential of the first node; and
a second switch configured to reset a potential of the second node.

21. The control circuit according to claim 20, wherein the second switch is turned off at the third point in time.

* * * * *